United States Patent

Huynh et al.

[11] Patent Number: 5,997,186
[45] Date of Patent: Dec. 7, 1999

[54] HYBRID CABLE SPLICE CLOSURE AND RELATED METHODS

[76] Inventors: Van L. Huynh, 408 Avery St., Garner, N.C. 27529; John R. Holman, 8810 River Trace Dr., Duluth, Ga. 30097; Randy D. Wilkinson, 76 Lester St., Angier, N.C. 27501; Kenton A. Blue, 11932 Raven Ridge Rd., Raleigh, N.C. 27614; Mel B. Nance, 5105 Damask Ct., Fuquay Varina, N.C. 27526; Rhonda W. Wood, 205 Black Creek Ct., Willow Spring, N.C. 27592; Gerald Leo Shimirak, 6008 Misty Ridge Rd., Holly Springs, N.C. 27540

[21] Appl. No.: 09/078,152

[22] Filed: May 13, 1998

[51] Int. Cl.⁶ .............................. G02B 6/255; G02B 6/00
[52] U.S. Cl. ............................................. 385/99; 385/135
[58] Field of Search ......................... 385/95–99, 147, 385/135; 439/395

[56] References Cited

U.S. PATENT DOCUMENTS

| | | | |
|---|---|---|---|
| 4,498,732 | 2/1985 | Campbell et al. | 385/99 |
| 5,059,137 | 10/1991 | Dale et al. | 439/395 |
| 5,479,553 | 12/1995 | Daniel et al. | 385/135 |
| 5,692,299 | 12/1997 | Dames et al. | 29/869 |
| 5,764,844 | 6/1998 | Neves | 385/135 |
| 5,793,921 | 8/1998 | Wilkins et al. | 385/136 |
| 5,825,961 | 10/1998 | Wilkins et al. | 385/135 |

*Primary Examiner*—Akm E. Ullah
*Attorney, Agent, or Firm*—Herbert G. Burkard

[57] ABSTRACT

An in-line splice closure for splicing two hybrid fiber and signal conductor cables includes an outer housing having opposing first and second ends for receiving respective ends of the cables. An organizer tube extends within the outer housing. Electrical connectors are positioned within the organizer tube for connecting signal conductors of the first and second hybrid cables. The splice closure preferably includes at least one optical splice for connecting optical fibers of the first and second cables, and an optical fiber support wrapped around an outer surface of the organizer tube for supporting the at least one optical splice and adjacent optical fiber slack portions. The organizer tube preferably has a predetermined diameter and the optical fiber support preferably supports the optical fiber slack portions so as not to exceed the minimum bend radius. The organizer tube preferably has a longitudinally extending groove in an outer surface portion for receiving buffer tubes of the cables. The optical fiber support may comprise a flexible substrate for supporting the fibers. The flexible substrate may comprise a body of flexible compressible material having a disk or oval shape and having radially extending slits for receiving optical fiber slack portions. The flexible substrate may alternately include integrally formed guide portions.

50 Claims, 6 Drawing Sheets

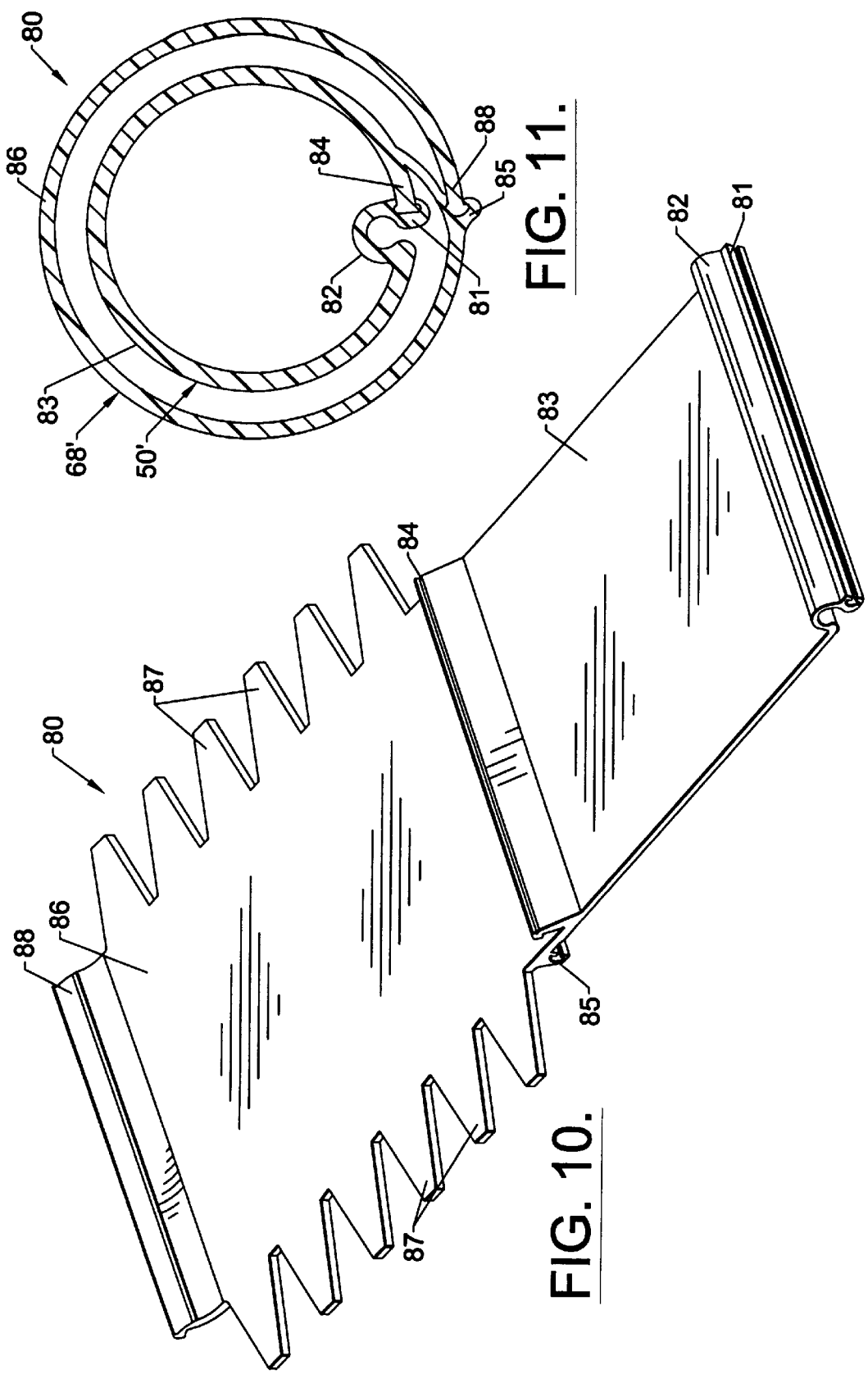

HYBRID CABLE SPLICE CLOSURE AND RELATED METHODS

FIELD OF THE INVENTION

The present invention relates to communications equipment, and, more particularly, to a splice closure for optical fibers and signal conductors and related methods.

BACKGROUND OF THE INVENTION

Optical fibers are widely used in telecommunications applications because of their wide bandwidth and ability to carry signals for long distances. An optical fiber cable may carry a plurality of individual optical fibers. Each fiber, in turn, can carry digital or analog signals over a relatively long distance without requiring amplifiers. In addition to providing such backbone communications, optical fiber cables are also being used to drop high bandwidth signals to groups of subscribers or directly to individual subscribers Such drop cables are typically low fiber count cables which are connected at one end to a trunk distribution system, and at the other end to electronics which convert the optical signals to electrical signals.

There may be occasions where it is desired to splice an optical fiber cable, such as for repair or installation. U.S. Pat. No. 4,498,732, for example, assigned to the assignee of the present invention, discloses an in-line splice closure for an optical fiber cable. The patent discloses a cylindrical core having tapered ends extending between first and second ends of the splice closure. The fiber slack is positioned on a sheet, such as of polymeric foam for cushioning, and the sheet is wrapped around the core. Accordingly, the minimum bend radius of the optical fibers is not exceeded as the slack fiber forms a pair of helices of opposite handedness. A heat shrink sleeve may be placed over the tube and fibers to complete the splice closure. Unfortunately, the amount of slack that may be stored is somewhat limited in that the slack must follow a helical pattern.

Copper wire cables are also widely used for communications. The copper wires are typically arranged in twisted pairs to reduce the effects of noise. The twisted pairs may also have a relatively large bandwidth for short distances, as may be the case for drop cable applications.

There are so-called hybrid or composite optical fiber and copper wire cables that combine the benefits of both technologies, such as for subscriber drop applications. One such hybrid cable includes two cable portions, one for copper pairs or signal conductors, and the other for optical fibers, and wherein both cable portions are enclosed within a common outer jacket or sheath. The signal conductor cable portion typically includes a metallic shield and an overall plastic jacket. In addition, the optical fiber cable portion typically includes a central buffer tube surrounding the fibers. A typical hybrid drop cable may contain from 2 to 6 twisted pairs of signal conductors, and from 1 to 4 optical fibers, and an overall plastic jacket.

Although the splice closure described in U.S. Pat. No. 4,498,732 represents a significant advance in a compact and rugged splice closure, it has no provisions for splicing or connecting the signal conductors of a hybrid cable. Unfortunately, conventional splice closures for either optical fibers or signal conductors are not readily adapted for such hybrid cables, especially where a relatively compact splice closure is desired, and wherein the bend radius of the optical fibers may not be exceeded.

SUMMARY OF THE INVENTION

In view of the foregoing background, it is therefore an object of the present invention to provide an in-line splice closure and related method for splicing hybrid or composite optical fiber and signal conductor cables, such as for repair or installation, and wherein the splice closure is relatively compact and rugged.

These and other objects, features and advantages in accordance with the present invention are provided by an in-line splice closure for first and second hybrid cables each of a type including at least one optical fiber and at least one signal conductor, and wherein the splice closure includes an organizer tube. More particularly, the splice closure preferably comprises an outer housing having opposing first and second ends for receiving respective ends of the first and second cables. The organizer tubas extends within the outer housing. At least one electrical connector is positioned within the organizer tube for connecting signal conductors of the first and second cables.

The splice closure also preferably includes at least one optical splice for connecting optical fibers of the first and second cables, and optical fiber support means wrapped around an outer surface of the organizer tube for supporting the at least one optical splice and adjacent optical fiber slack portions. The optical fibers will have a minimum bend radius. Accordingly, the organizer tube preferably has a predetermined diameter and the optical fiber support means preferably supports the optical fiber slack portions so as not to exceed the minimum bend radius.

The first and second hybrid cables may each further comprise a buffer tube surrounding the at least one optical fiber. The organizer tube may be provided by a rigid material or a compressible foam material. According to another advantageous feature of the invention, the organizer tube preferably has a longitudinally extending groove in an outer surface portion for receiving the buffer tubes. The organizer tube may include a longitudinal slit to facilitate opening and positioning of the organizer tube onto the underlying components. In addition, the organizer tube may include a longitudinal hinge opposite the slit.

The optical fiber support means may comprise a flexible substrate for supporting the fibers. The optical fiber support means may also Include at least one flexible sheet or bag covering the flexible substrate to further protect the fibers. In addition, the flexible substrate may comprise a body of flexible compressible material having a predetermined geometric shape and having a plurality of slits extending outwardly to peripheral portions of the predetermined geometric shape for receiving the optical fiber slack portions. In one embodiment, the predetermined geometric shape is a disk shape so that the flexible substrate defines a disk-shaped body of compressible material having a plurality of radially outwardly extending slits. The geometric shape may also be generally oval. The fiber slack may be readily positioned to pass through the slits, and be maintained in position by the compressible material of the disk. Alternately, the flexible substrate may be formed of a compressible foam material with a series of fiber guides extending outwardly to receive the fiber slack portions.

In some embodiments, the first and second hybrid cables may each further include a metallic shield. Accordingly, another feature of the splice closure is that it may include an elongate shield conductor extending within the housing and the organizer tube, as well as first and second clamps for connecting opposing ends of the shield conductor to respective ends of the metallic shields of the cables.

The outer housing preferably comprises a heat shrink material to ensure a good environmental seal. The splice closure may also include at least one body of sealing material adjacent opposing first and second ends of the housing for sealing same to the respective first and second cables. A body of damming material may also be positioned adjacent respective bodies of sealing material to retain the sealing material adjacent the respective cable ends.

For further protection, the splice closure may include an inner housing positioned underlying the outer housing. The inner housing may be a rigid two-piece plastic member and having tapered end portions.

A method aspect of the invention is for making an in-line splice for first and second hybrid cables each of a type including at least one optical fiber and at least one signal conductor. The method preferably comprises the steps of: connecting at least one electrical connector between respective signal conductors of the cables; positioning an organizer tube extending between first and second ends of the cables and surrounding the at least one electrical connector; forming at least one optical splice for connecting optical fibers of the cables; and supporting the at least one optical splice and adjacent optical fiber slack portions on a support member and wrapping the support member around an outer surface of the organizer tube.

The method may also include the step of positioning and securing an outer housing having opposing first and second ends to receive respective ends of the first and second hybrid cables. For example, the outer housing may comprise a heat shrink material, and the step of securing may include heating the heat shrink material. In addition, the method may also include the step of positioning a body of sealing material adjacent opposing first and second ends of the outer housing. These sealing material bodies, when heated, will flow and seal the cable to the outer housing.

BRIEF DESCRIPTION OF THE DRAWINGS

FIG. 10 is a perspective view of a molded sheet which can be assembled to form a second embodiment of an organizer tube and inner housing in accordance with the present invention.

FIG. 11 is a cross-sectional view of the second embodiment of the organizer tube and inner housing shown in an assembled condition, but without optical splices and other components for clarity.

DETAILED DESCRIPTION OF THE PREFERRED EMBODIMENTS

Figure 1:
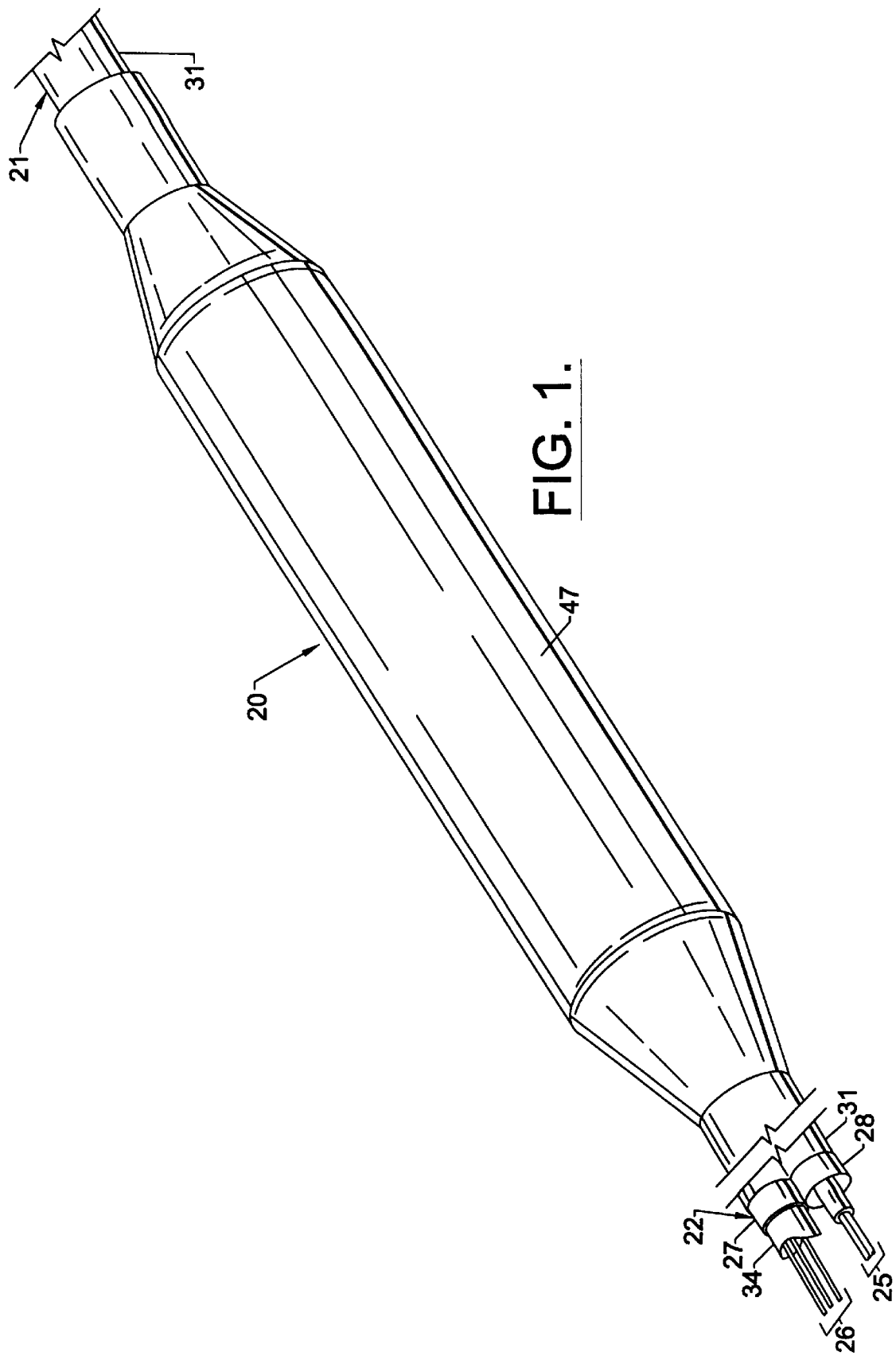
FIG. 1 is a perspective view of an in-line splice closure in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout and prime notation is used to indicate similar elements in alternate embodiments.

Referring initially to FIGS. 1 through 9 a first embodiment of a splice closure 20 and its assembly procedure are explained. More particularly, the splice closure 20 is an in-line closure for first and second hybrid cables 21, 22 each of a type including at least one optical fiber 25 and at least one signal conductor 26. Each of the hybrid cables 21, 22 may include a jacket 27 for the twisted pairs or signal conductors 26, as well as a jacket 28 for the optical fibers 25. In addition, an overall plastic jacket or sheath 31 may also be provided for encompassing both cable portions as will be readily appreciated by those skilled in the art. The illustrated optical fiber cable portions also include respective buffer tubes 32 which may be centrally located for low fiber count cables. In addition, the signal conductor cable portion may include a metallic sheath 34 underlying the jacket 27 as will be readily appreciated by those skilled in the art.

As will also be readily appreciated by those skilled in the art, the hybrid cables 21, 22 may include other components, such as for longitudinal strength, for example. In addition, the hybrid cables 21, 22 may have configurations other than the side-by-side arrangement within a common sheath 31 as shown in the illustrated embodiment.

Figure 2:
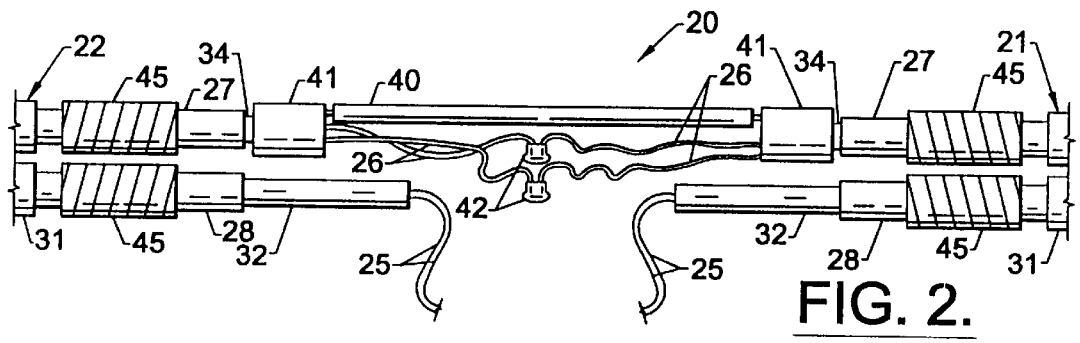
FIGS. 2 through 6 are side-elevational views of portions of the splice closure being assembled in accordance with the present invention

Referring more particularly to FIG. 2, the cable ends may be trimmed and the appropriate slack lengths of fibers 25 and signal conductors 26 exposed. An elongate conductor 40, which may be in the form of a relatively large gauge insulated wire, is connected by suitable crimp clamps 41 to exposed portions of the metallic shield 34 of the cables 21, 22. Accordingly, the metallic shield 34 will have continuity through the closure 20.

Appropriate connectors 42 may be secured to the ends of the signal conductors 26 as will be readily appreciated by those skilled in the art to thereby splice the conductors. In the illustrated embodiment only two conductors 26 are shown, however, the number of conductors for a typical hybrid drop cable may be in the range of from 2 to 6 pairs. Of course, the splice closure 20 in accordance with the present invention may accommodate even a single conductor or more than twelve conductors.

Heat shield and sealing tapes 45 are also shown in the illustrated embodiment wrapped around the individual jackets 27, 28 of each cable 21, 22. These tape wrappings 45 will provide a shield from heat which is applied to shrink the outer housing 47 as will be explained in greater detail below.

Figure 3:
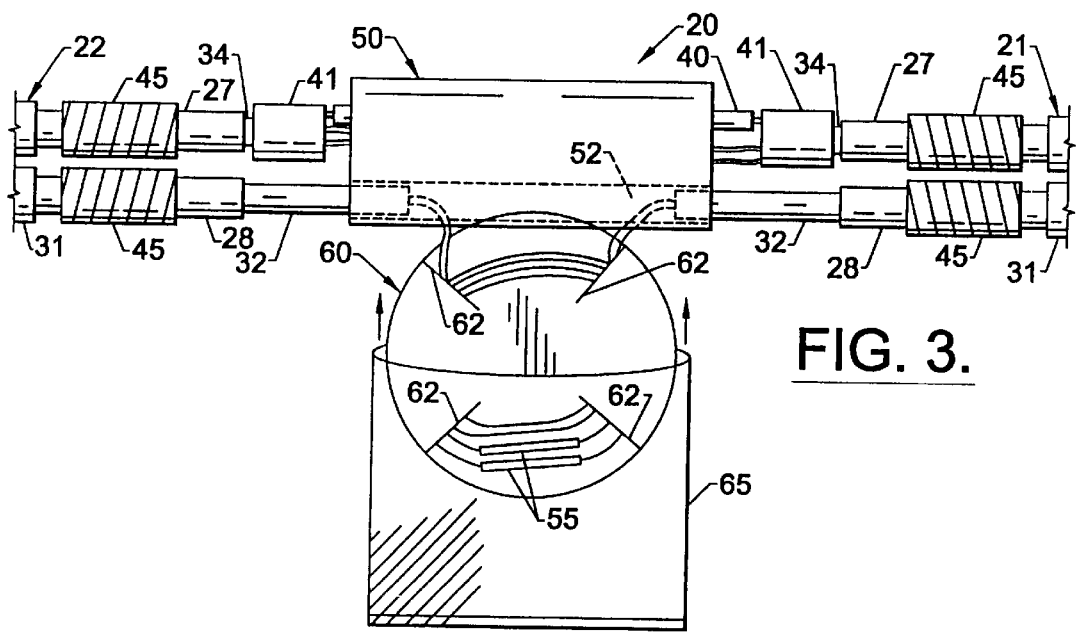
Figure 8:
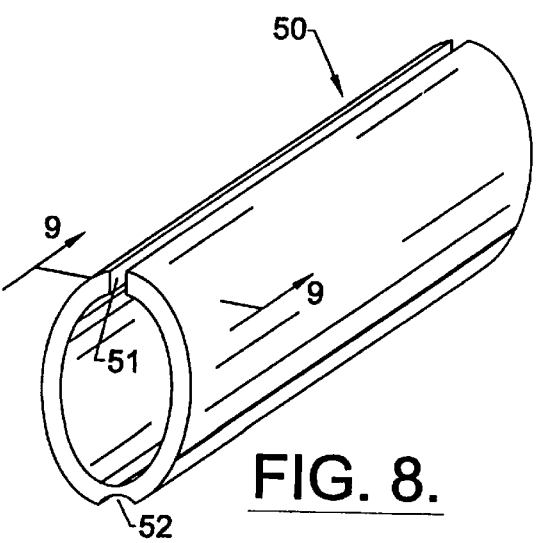
FIG. 8 is a perspective view of the organizer tube as used in the splice closure in accordance with the present invention.
Figure 9:
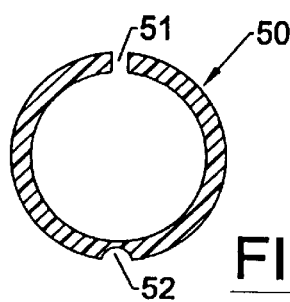
FIG. 9 is a cross-sectional view taken along lines 9—9 of FIG. 8.

Turning now more particularly to FIGS. 3, 8 and 9, the positioning and function of the organizer tube 50 is illustrated and explained. The organizer tube 50 may be provided by a plastic rigid tube having a longitudinally extending slit 51 therein (FIGS. 8 and 9). In addition, the organizer tube 50 may also include a longitudinally extending channel, groove, or recess 52 opposite the slit 51 as shown in the illustrated embodiments. The portion of reduced wall thickness underlying the groove 52 may also define a living hinge for the organizer tube 50 to permit the tube to be expanded to be positioned over the spliced signal conductors 26, and the elongate sheath conductor 40. In other embodiments, the hinge and groove 52 may be at different locations.

The organizer tube 50 provides a protective cover for the splices 42 in the signal conductors 26 as well as provides a mounting structure for the fiber splices 55. As shown in FIG. 3, the buffer tubes 32 for the cables 21,22 are positioned in the groove 52. The buffer tubes 32 may snap fit into the groove 52 if appropriately sized, or tape or other securing means may be used to hold the buffer tubes 32 in position, as will be readily appreciated by those skilled in the art.

Figure 7:
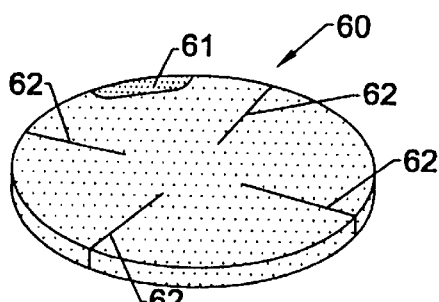
FIG. 7 is a perspective view of an embodiment of the flexible substrate for holding optical fiber slack and splices in accordance with the present invention.

A flexible substrate in the illustrated form of a compressible foam disk 60 includes an adhesive layer 61 at an edge portion thereof (FIG. 7). The disk 60 is secured to the organizer tube 50 adjacent the groove 52 as shown in FIG. 3. Once the splices 55 have been completed, the slack fiber portions may be wound in a circular pattern on the disk 60 using the radially extending slits 62 to capture and hold the slack portions.

Considered in somewhat different terms, the flexible substrate for supporting the fiber 25 and splices 55 may comprise a body of flexible compressible material having a predetermined geometric shape and having a plurality of slits extending outwardly to peripheral portions of the predetermined geometric shape for receiving optical fiber slack portions therein. In the illustrated embodiment, the predetermined geometric shape is a disk shape so that the flexible substrate defines a disk-shaped body of compressible material 60 having a plurality of radially outwardly extending slits 62 therein. The slits 62 may be sufficiently spaced to accommodate the splices 55 without requiring a sharp bend adjacent the ends of the splices as will be readily appreciated by those skilled in the art. The slits 62 may also have a width on the order of about ⅛ inch to receive the fiber slack. In other equivalent embodiments, the flexible substrate may have other shapes as well.

The slack fiber 55 may be readily positioned to pass through the slits 62, and be maintained in position by the compressible material of the disk 60. For example, the slits 62 may be four in number as in the illustrated and these slits may be equally spaced from one another. The slits 62 also allow the disk 60 to accommodate varying lengths of fiber slack, since smaller diameter or larger diameter slack coils may be formed and retained in the slits.

The compressible material of the disk 60 also provides a cushion for the fibers 25 and the splices 55. The splices 55 may be any conventional fusion or mechanical splice as will be readily appreciated by those skilled in the art.

Figure 4:
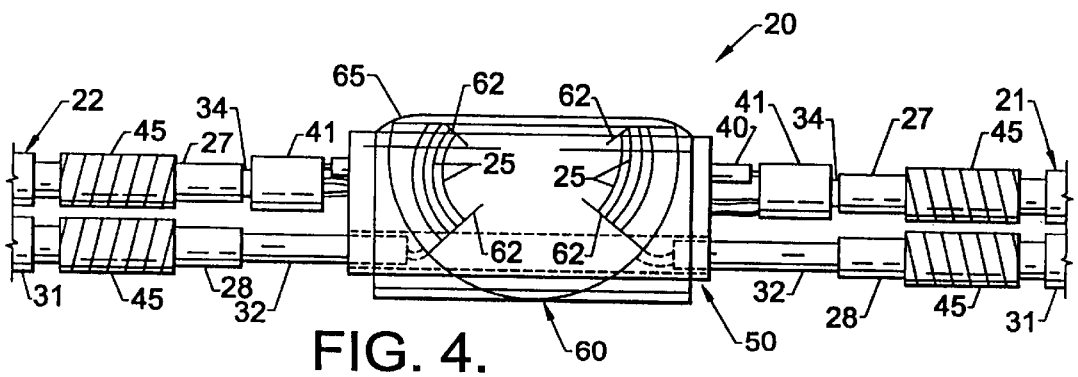

As also shown first in FIG. 3 and carrying over to FIG. 4, a plastic protective covering or bag 65 having an opening at its upper end may be positioned to cover the disk 60. The bag 65 may then be wrapped and secured about the underlying organizer tube 50. The bag 65 may be secured with a wrapping of tape, for example, not shown. A single sheet of plastic may also be wrapped around and secured to the organizer tube 50 to thereby secure and protect the disk 60 in another variation of the invention, not shown. The flexible plastic sheet can also be integrally formed with the substrate or disk 60 as will be appreciated by those skilled in the art.

As will also be readily appreciated by those skilled in the art, the optical fibers 25 will have a minimum bend radius.

Accordingly, the organizer tube 50 preferably has a predetermined diameter and the optical fiber support disk 60 preferably supports the optical fiber slack portions so as not to exceed the minimum bend radius. For example, the organizer tube 50 may have a diameter of greater than about 1 inch, and preferably about 1 and ⅜ inches. In addition, the support disk 60 may have a diameter of about 4 inches, and the slits 62 may extend about ¾ inches.

Figure 5:
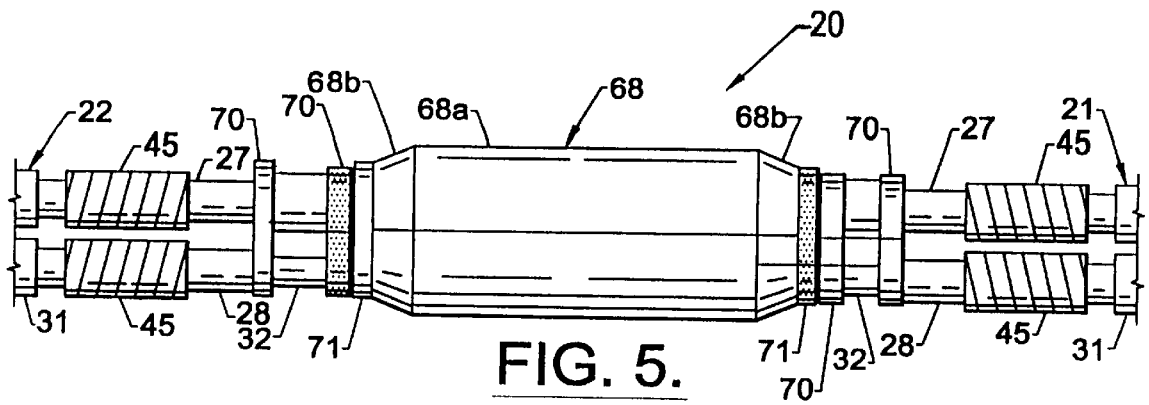

Turning now more particularly to FIG. 5, other aspects of the splice closure 20 are explained in greater detail. An inner housing 68 includes a tubular body portion 68a and opposing tapered end portions 68b as shown in the illustrated embodiment The inner housing 68 may be provided by a molded clamshell-type plastic tube having a longitudinally extending living hinge opposite a longitudinal slit, for example. Other configurations for the inner housing 68 are also contemplated by the present invention. For example, the inner housing 68 may be provided by two halves, formed of plastic or metal. The two halves may be joined together by conventional means. The inner housing 68 provides a protective covering between the outer housing 47 and interior components.

In the illustrated embodiment, the splice closure 20 also includes two spaced apart bodies of sealing material 70 positioned adjacent each end of the closure. The sealing material bodies 70 may be in the form of a cut ring to permit positioning onto the cables. In addition, the sealing bodies may include a material which flows when heated to thereby form a secure environmental seal as will be readily appreciated by those skilled in the art. A pair of dams in the form of wound foam tape 71 may be provided inboard of the sealing material bodies 70 to confine the flow of sealing material as will also be readily appreciated by those skilled in the art.

Figure 6:
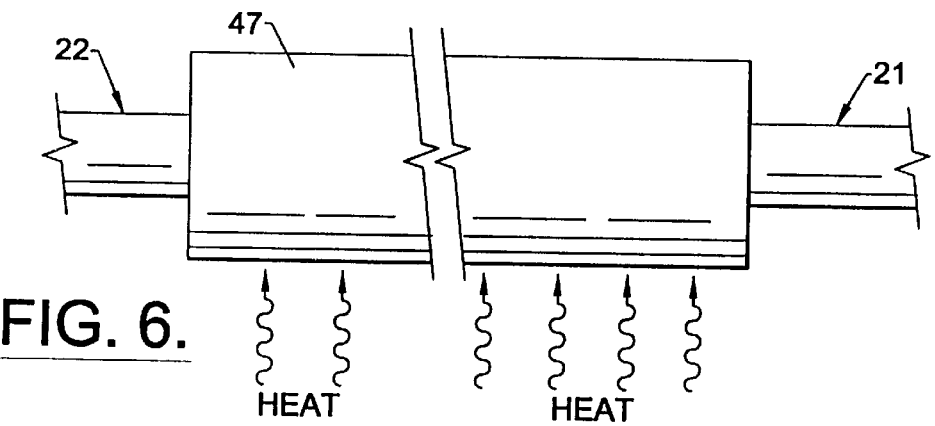

As shown in FIG. 6, heat may be applied to the outer housing 47 once properly positioned. The heat causes the heat shrinkable material to shrink in the radial direction to thereby form a secure and effective environmental seal for the closure 20. The heat also causes melting and flow of the bodies of sealing material 70 as described above.

Turning now additionally to FIGS. 10 and 11 another variation of an organizer tube 50', and inner housing is now explained. The molded plastic sheet 80 as shown in the flattened position of FIG. 10 may be rolled and connected to form the cross-sectional shape as shown in FIG. 9. The sheet 80 includes a first female locking portion 81 immediately adjacent a buffer tube groove portion 82. A first wall portion 83 is connected to the buffer tube groove portion 82. A first male locking portion 84 is connected to the opposite end of the first wall portion 83. A second female locking portion 85 is connected to the first wall portion 83 on an opposite side and adjacent the first male locking portion 84.

A second wall portion 86 is connected to the second female locking portion 85. In the illustrated embodiment, the second wall portion 85 includes tapered tab portions 86 which will form tapered ends when the sheet 80 is assembled as will be appreciated by those skilled in the art. A second male locking portion 88 is at the end of the second wall portion 86.

When the first male locking portion 84 is assembled into the corresponding first female locking portion 81 the first wall portion 83 provides an organizer tube 50' as shown in FIG. 9. The disk 60 and cover bag 65 supporting the optical fiber splices and slack may be positioned around the thus formed organizer tube 50' as discussed above. In addition, one or more electrical connections or splices may be positioned in the interior of the organizer tube 50'.

When the second male locking member 88 is positioned in the corresponding second female locking portion 85, the inner housing 68' is formed by the second wall portion 86. Accordingly, the single molded sheet 80 may be used to provide both the organizer tube 50' and the inner housing 68' in this illustrated embodiment. An outer housing 47 as described above may be provided over the thus formed structure as will be readily appreciated by those skilled in the art. Of course, those of skill in the art will also readily appreciate other similar arrangements which are also contemplated by the present invention.

Figure 12:
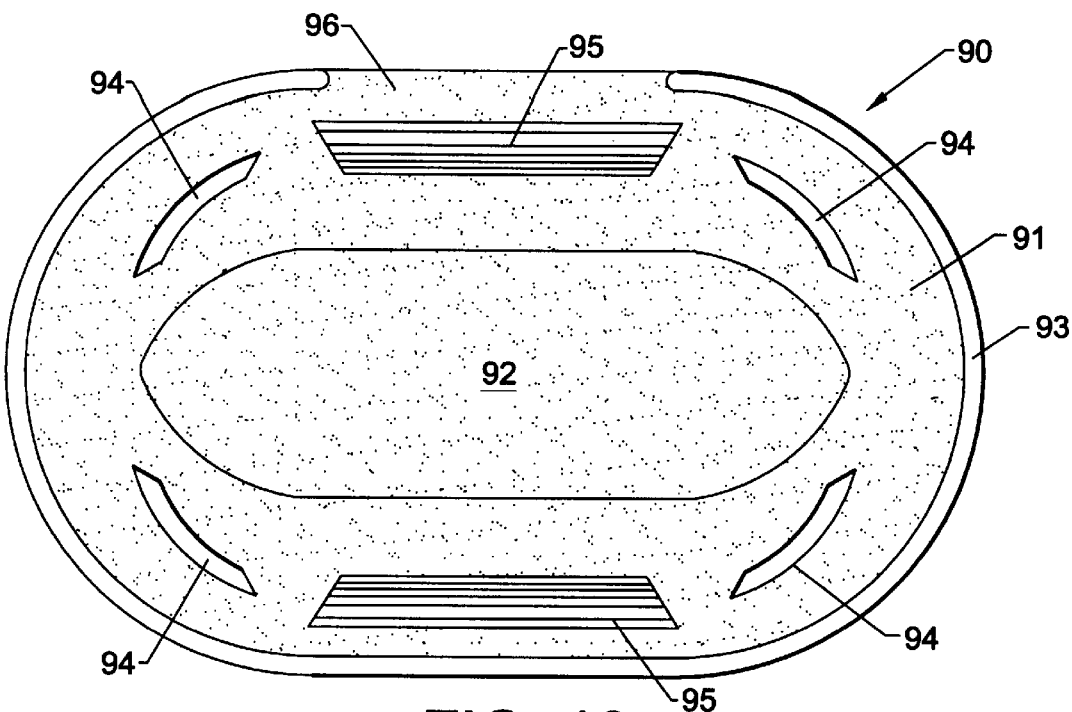
FIG. 12 is a plan view of another embodiment of a flexible substrate for holding optical fiber slack and splices in accordance with the present invention.

Turning now more particularly to FIG. 12, another embodiment of the flexible substrate 90 is now explained. The flexible substrate 90 is preferably formed of a compressible foam material as will be readily appreciated by those skilled in the art and as schematically illustrated in the figure by stippling. The substrate 90 includes a base portion 91 and a plurality of fiber guide portions 92, 93, and 94 extending outwardly from the base. More particularly, the fiber guide portions include an inner generally oval guide 92, an outer perimeter wall guide 93 and a series of four spaced medial guides 94. In addition, a pair of splice holders 95 may also be integrally formed with the base and guide portions. An opening 96 in the perimeter wall guide 95 permits entry of the fiber slack onto the substrate 90.

The fiber guides 92, 93 and 94 are formed so that the fiber slack may be stored while meeting the minimum bend radius requirement as will be readily appreciated by those skilled in the art. It may be preferable that two loops are defined by the guides wherein the perimeter of the outer loop adjacent the perimeter wall guide 93 is about twice the length of the inner loop adjacent inner guide 92. Of course, other configurations are also contemplated by the present invention as will be readily appreciated by those skilled in the art.

Figure 13:
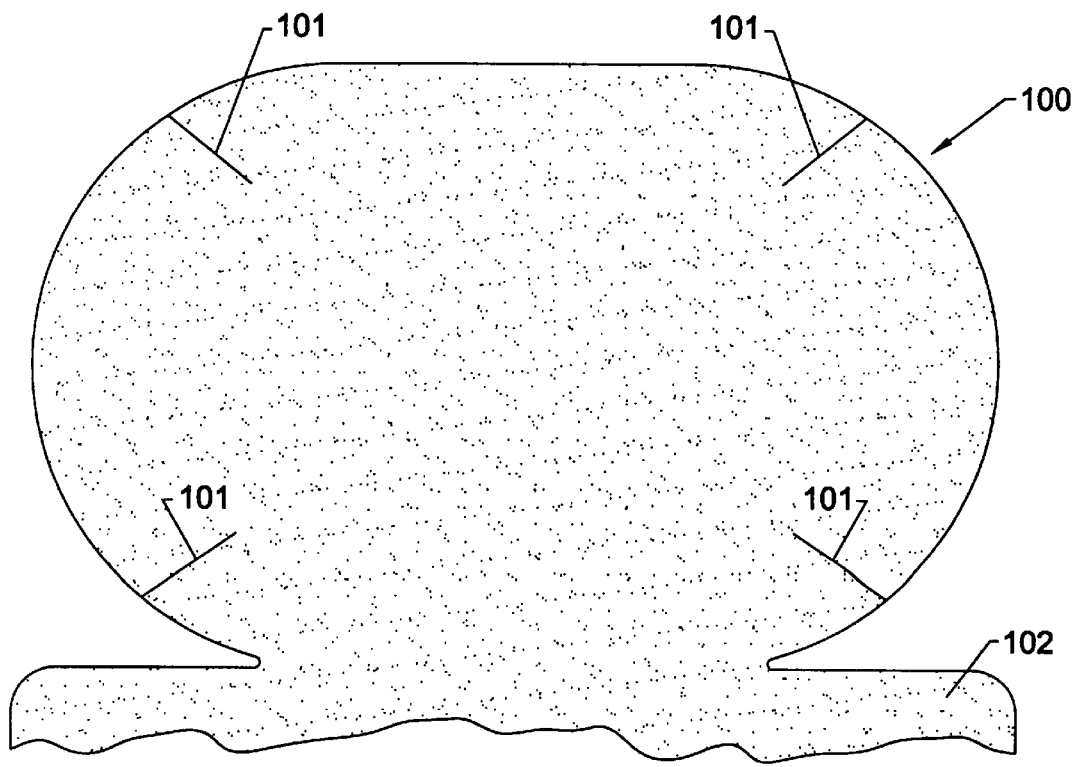
FIG. 13 is a plan view of another embodiment of a flexible substrate for holding optical fiber slack and splices in accordance with the present invention.

Yet another embodiment of a flexible fiber supporting substrate 100 is explained with reference to FIG. 13. In this embodiment, the substrate 100 also has a generally oval or racetrack shape, and may also be formed of a compressible foam material as schematically illustrated by stippling. In this embodiment, the substrate 90 is provided by a generally planar sheet of material having four illustrated slits 101 extending inwardly from the perimeter thereof. The slits 101 permit fiber slack portions to be routed on and carried by the substrate 100. A lesser or greater number of slits may be desirable in alternate embodiments. In addition, this embodiment 100 further illustrates a portion of an integrally formed flexible sheet 10 which can be wrapped around the completed splices for additional protection.

Figure 14:
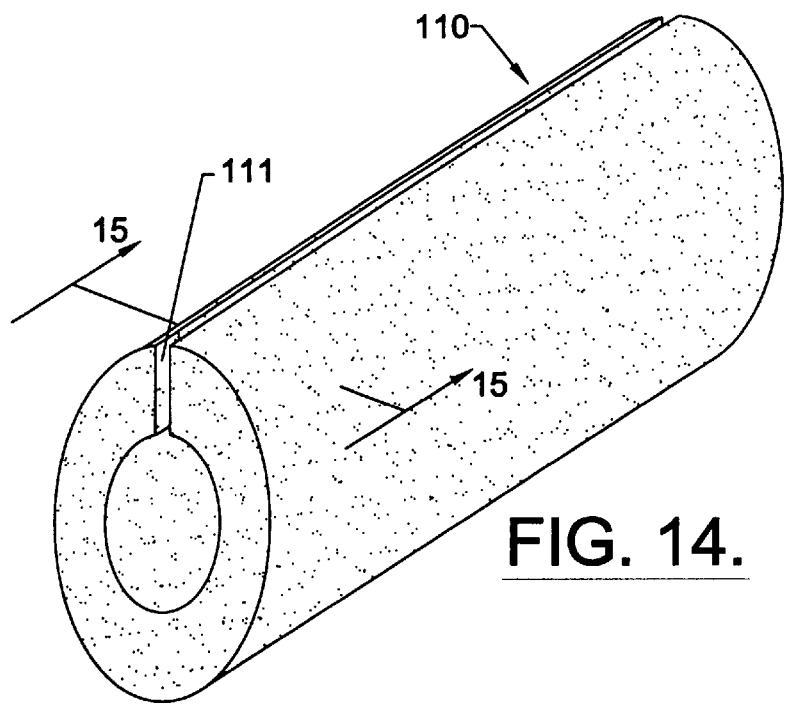
FIG. 14 is a perspective view of another embodiment of the organizer tube as used in the splice closure in accordance with the present invention.
Figure 15:
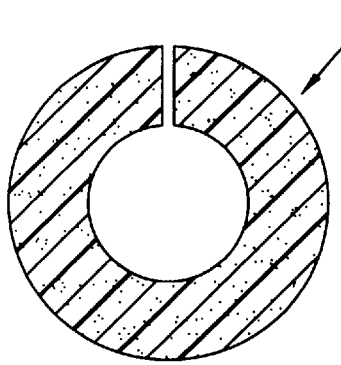
FIG. 15 is a cross-sectional view taken along line 15—15 of FIG. 14.

Another embodiment of an organizer tube 110 is explained with reference to FIGS. 14 to 16. In particular, the organizer tube 110 may be provided by a somewhat compressible molded foam tube with a longitudinal slit 111 therein. The organizer tube 110 may have a slightly greater wall thickness than alternate rigid embodiments as described in greater detail above. The compressible molded foam tube, schematically illustrated by stippling, may deform radially inwardly to receive the fiber buffer tubes as will be readily appreciated by those skilled in the art. Since the inner housing 68 (FIG. 5) is preferably rigid, the substrate 110 may be made from the compressible foam material without increasing the risk of damaging the fibers.

Figure 16:
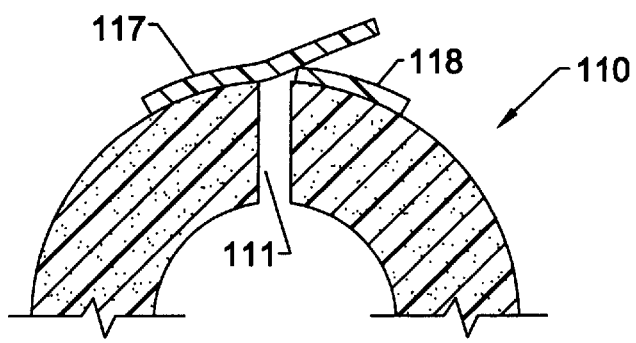
FIG. 16 is an enlarged cross-sectional view of an organizer tube as shown in FIGS. 14 and 15 further including a sealing tape connected thereto.

As shown in FIG. 16, the longitudinal slit 111 may be sealed by a tape 117. The tape 117 may be secured along one side to the organizer tube 110 adjacent the slit 111. The opposite tube portion adjacent the slit 111 may carry an adhesive layer to which a release strip 118 is initially secured. The technician may remove the release strip 118 and press the free edge portion of the tape to the adhesive layer to thereby cover the slit 111. In addition, and as will be readily appreciated by those skilled in the art, the fiber buffer tubes 32 (FIG. 3) may be secured under the free edge portion of the tape 118 as it is secured to the organizer tube 110.

While many of the features of the present invention have been described herein as applied to an in-line splice closure 20 for hybrid cables 21, 22, those of skill in the art will appreciate that certain features may be used in other applications. For example, the compressible disk 60 or substrate 100 having the pattern of slits therein may be used in splice closures for only optical fibers. Accordingly, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. An in-line splice closure for first and second hybrid cables each of a type including at least one optical fiber and at least one signal conductor, the in-line splice closure comprising:

an outer housing having opposing first and second ends for receiving respective ends of the first and second hybrid cables;

an organizer tube extending within said outer housing;

at least one electrical connector within said organizer tube for connecting signal conductors of the first and second hybrid cables;

at least one optical splice for connecting optical fibers of the first and second hybrid cables; and optical fiber support means wrapped around an outer surface of said organizer tube for supporting the at least one optical splice and adjacent optical fiber slack portions.

2. An in-line splice closure according to claim 1 wherein the optical fibers have a minimum bend radius; and wherein said organizer tube has a predetermined diameter and said optical fiber support means supports the optical fiber slack portions so as not to exceed the minimum bend radius.

3. An in-line splice closure according to claim 2 wherein the predetermined diameter of said organizer tube is greater than about one inch.

4. An in-line splice closure according to claim 1 wherein the first and second hybrid cables each further comprises a buffer tube surrounding the at least one optical fiber; and wherein said organizer tube has a longitudinally extending groove in an outer surface portion for receiving the buffer tubes.

5. An in-line splice closure according to claim 1 wherein said organizer tube comprises a rigid material.

6. An in-line splice closure according to claim 1 wherein said organizer tube comprises a compressible foam material.

7. An in-line splice closure according to claim 1 wherein said organizer tube has a longitudinally extending slit therein to facilitate opening and positioning of said organizer tube.

8. An in-line splice closure according to claim 7 wherein said organizer tube comprises a longitudinally extending hinge opposite the longitudinally extending slit.

9. An in-line splice closure according to claim 1 wherein said optical fiber support means comprises a flexible substrate.

10. An in-line splice closure according to claim 9 wherein said optical fiber support means further comprises at least one flexible sheet covering said flexible substrate.

11. An in-line splice closure according to claim 9 wherein said flexible substrate comprises a body of flexible compressible foam material having a predetermined geometric shape and having a plurality of slits extending outwardly to peripheral portions of the predetermined geometric shape for receiving optical fiber slack portions therein.

12. An in-line splice closure according to claim 9 wherein said flexible substrate comprises a body of flexible compressible foam material comprising integrally formed outwardly extending fiber guide portions.

13. An in-line splice closure according to claim 1 wherein the first and second hybrid cables each further comprises a metallic shield; and further comprising:
   an elongate shield conductor extending within said outer housing and said organizer tube; and
   first and second clamps for connecting opposing ends of said elongate shield conductor to respective ends of the metallic shields of the first and second hybrid cables.

14. An in-line splice closure according to claim 1 wherein said outer housing comprises a heat shrink material.

15. An in-line splice closure according to claim 1 further comprising at least one body of sealing material adjacent opposing first and second ends of said outer housing for sealing same to the respective first and second hybrid cables.

16. An in-line splice closure according to claim 15 further comprising a body of damming material positioned adjacent respective bodies of sealing material to retain the sealing material adjacent respective cable ends.

17. An in-line splice closure according to claim 1 further comprising an inner housing positioned underlying said outer housing.

18. An in-line splice closure according to claim 17 wherein said inner housing comprises tapered end portions.

19. An in-line splice closure for first and second hybrid cables each of a type including at least one optical fiber, a metallic shield, and at least one signal conductor, the in-line splice closure comprising:
   an outer housing having opposing first and second ends for receiving respective ends of the first and second hybrid cables;
   an elongate shield conductor for connecting respective ends of the metallic shields of the first and second hybrid cables;
   an organizer tube extending within said outer housing;
   at least one electrical connector within said organizer tube for connecting signal conductors of the first and second hybrid cables;
   at least one optical splice for connecting optical fibers of the first and second hybrid cables; and
   a flexible substrate wrapped around an outer surface of said organizer tube for supporting the at least one optical splice and adjacent optical fiber slack portions.

20. An in-line splice closure according to claim 19 wherein the optical fibers have a minimum bend radius; and wherein said organizer tubs has a predetermined diameter and flexible substrate supports the optical fiber slack portions so as not to exceed the minimum bend radius.

21. An in-line splice closure according to claim 19 wherein the first and second hybrid cables each further comprises a buffer tube surrounding the at least one optical fiber; and wherein said organizer tube has a longitudinally extending groove in an outer surface portion for receiving the buffer tubes.

22. An in-line splice closure according to claim 19 wherein said organizer tube comprises a rigid material.

23. An in-line splice closure according to claim 19 wherein said organizer tube comprises a compressible foam material.

24. An in-line splice closure according to claim 19 further comprising at least one flexible sheet covering said flexible substrate.

25. An in-line splice closure according to claim 19 wherein said flexible substrate comprises a body of flexible compressible foam material having a predetermined geometric shape and having a plurality of slits extending outwardly to peripheral portions of the predetermined geometric shape for receiving optical fiber slack portions therein.

26. An in-line splice closure according to claim 19 wherein said flexible substrate comprises a body of flexible compressible foam material comprising integrally formed outwardly extending fiber guide portions.

27. An in-line splice closure according to claim 19 wherein said outer housing comprises a heat shrink material.

28. An in-line splice closure according to claim 19 further comprising an inner housing positioned underlying said outer housing.

29. An in-line splice closure for first and second cables each of a type including at least one optical fiber, the in-line splice closure comprising:
   an outer housing having opposing first and second ends for receiving respective ends of the first and second cables;
   an organizer tube extending within said outer housing; and
   a body of flexible compressible material positioned to extend around outer surface portions of said organizer tube and having a predetermined geometric shape and having a plurality of slits extending outwardly to peripheral portions of the predetermined geometric shape for receiving optical fiber slack portions therein.

30. An in-line splice closure according to claim 29 wherein the optical fibers have a minimum bend radius; and wherein said organizer tube has a predetermined diameter and said body of flexible compressible material supports the optical fiber slack portions so as not to exceed the minimum bend radius.

31. An in-line splice closure according to claim 29 wherein said predetermined geometric shape is a disk shape so that said flexible substrate defines a disk-shaped body of compressible material having a plurality of radially outwardly extending slits therein.

32. An in-line splice closure according to claim 29 wherein said predetermined geometric shape is a generally oval shape.

33. An in-line splice closure according to claim 29 further comprising at least one flexible sheet covering said body of flexible compressible material.

34. An in-line splice closure according to claim 29 wherein the first and second cables each further comprises a buffer tube surrounding the at least one optical fiber; and wherein said organizer tube has a longitudinally extending groove in an outer surface portion for receiving the buffer tubes.

35. An in-line splice closure according to claim 29 wherein said organizer tube comprises a rigid material.

36. An in-line splice closure according to claim 29 wherein said organizer tube comprises a compressible foam material.

37. An in-line splice closure according to claim 29 wherein said organizer tube comprises a longitudinally extending slit therein to facilitate opening and positioning of said organizer tube.

38. An in-line splice closure according to claim 29 wherein the first and second cables each further comprises a metallic shield; and further comprising:
an elongate shield conductor extending within said outer housing and said organizer tube; and
first and second clamps for connecting opposing ends of said elongate shield conductor to respective ends of the metallic shields of the first and second cables.

39. An in-line splice closure according to claim 29 wherein said outer housing comprises a heat shrink material.

40. An in-line splice closure according to claim 29 further comprising an inner housing positioned underlying said outer housing.

41. A method for making an in-line splice for first and second hybrid cables each of a type including at least one optical fiber and at least one signal conductor, the method comprising the steps of:
connecting at least one electrical connector between respective signal conductors of the first and second hybrid cables;
positioning an organizer tube extending between first and second ends of the first and second hybrid cables and surrounding the at least one electrical connector;
forming at least one optical splice for connecting optical fibers of the first and second hybrid cables; and
supporting the at least one optical splice and adjacent optical fiber slack portions on a support member and wrapping the support member around an outer surface of the organizer tube.

42. A method according to claim 41 further comprising the step of positioning and securing an outer housing having opposing first and second ends to receive respective ends of the first and second hybrid cables.

43. A method according to claim 41 wherein the outer housing comprises a heat shrink material; and wherein the step of securing comprises heating the heat shrink material.

44. A method according to claim 43 further comprising the step of positioning at least one body of sealing material adjacent opposing first and second ends of the outer housing; and wherein the step of heating comprises heating to melt and flow the bodies of sealing material to seal the outer housing to the respective first and second hybrid cables.

45. A method according to claim 41 wherein the first and second hybrid cables each further comprises a buffer tube surrounding the at least one optical fiber; and further comprising the step of positioning the buffer tubes in a longitudinally extending groove in an outer surface portion of the organizer tube.

46. A method according to claim 41 wherein the step of supporting comprises covering the support member with at least one flexible sheet.

47. A method according to claim 41 wherein the support member comprises a body of flexible compressible material having a predetermined geometric shape and having a plurality of slits extending outwardly to peripheral portions of the predetermined geometric shape; and further comprising the step of positioning the optical fiber slack portions in the plurality of slits.

48. A method according to claim 41 wherein the support member comprises a body of flexible compressible foam material including integrally formed outwardly extending fiber guide portions; and further comprising the step of positioning the optical fiber slack portions in the guide portions.

49. A method according to claim 41 wherein the first and second hybrid cables each further comprises a metallic shield; and further comprising the step of connecting an elongate shield conductor between respective ends of the metallic shields of the first and second hybrid cables.

50. A method according to claim 41 further the step of positioning an inner housing underlying the outer housing.

* * * * *